US012436738B2

United States Patent
Lee et al.

(10) Patent No.: US 12,436,738 B2
(45) Date of Patent: *Oct. 7, 2025

(54) METHOD AND APPARATUS WITH DATA PROCESSING

(71) Applicants: Samsung Electronics Co., Ltd., Suwon-si (KR); Seoul National University R&DB Foundation, Seoul (KR)

(72) Inventors: Seungwon Lee, Hwaseong-si (KR); Namhyung Kim, Seoul (KR); Hanmin Park, Seoul (KR); Kiyoung Choi, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 884 days.

This patent is subject to a terminal disclaimer.

(21) Appl. No.: 17/689,454

(22) Filed: Mar. 8, 2022

(65) Prior Publication Data

US 2022/0188070 A1 Jun. 16, 2022

Related U.S. Application Data

(63) Continuation of application No. 16/843,199, filed on Apr. 8, 2020, now Pat. No. 11,301,209.

(30) Foreign Application Priority Data

May 24, 2019 (KR) .......................... 10-2019-0061458

(51) Int. Cl.
*G06F 7/02* (2006.01)
*G06F 7/544* (2006.01)
(Continued)

(52) U.S. Cl.
CPC ................ *G06F 7/02* (2013.01); *G06F 7/544* (2013.01); *G06F 7/74* (2013.01); *G06N 3/02* (2013.01)

(58) Field of Classification Search
CPC .......... G06F 7/02; G06F 7/544; G06F 7/5443; G06F 7/74; G06N 3/02-088
See application file for complete search history.

(56) References Cited

U.S. PATENT DOCUMENTS 5,993,051 A 11/1999 Jiang et al.
8,805,915 B2 8/2014 Yu et al.
(Continued)

FOREIGN PATENT DOCUMENTS

JP 2011-118633 A 6/2011
KR 1998-041799 A 8/1998
(Continued)

OTHER PUBLICATIONS

Lee, Dongwoo, Sungbum Kang, and Kiyoung Choi. "ComPEND: Computation Pruning through Early Negative Detection for ReLU in a deep neural network accelerator." Proceedings of the 2018 International Conference on Supercomputing. 2018. (10 pages in English).

(Continued)

*Primary Examiner* — Emily E Larocque
(74) *Attorney, Agent, or Firm* — NSIP Law

(57) ABSTRACT

A processor-implemented method of processing neural network data includes: setting first limit data by performing a first operation based on first input data and weight data generated from weights included in a filter; comparing the first limit data with an intermediate result of a second operation performed based on second input data and the weight data; and determining whether to perform a subsequent second operation based on a result of the comparing.

19 Claims, 13 Drawing Sheets

(51) Int. Cl.
 *G06F 7/74* (2006.01)
 *G06N 3/02* (2006.01)

(56) References Cited

U.S. PATENT DOCUMENTS

| | | |
|---|---|---|
| 2005/0102246 A1 | 5/2005 | Movellan et al. |
| 2011/0131262 A1 | 6/2011 | Nakazato |
| 2019/0228307 A1 | 7/2019 | Lee et al. |

FOREIGN PATENT DOCUMENTS

| | | |
|---|---|---|
| KR | 10-2004-0033198 A | 4/2004 |
| KR | 10-2012-0053343 A | 5/2012 |
| KR | 10-2019-0013162 A | 2/2019 |
| KR | 10-2019-0089685 A | 7/2019 |

OTHER PUBLICATIONS

Akhlaghi, Vahideh, et al. "Snapea: Predictive early activation for reducing computation in deep convolutional neural networks." 2018 ACM/IEEE 45th Annual International Symposium on Computer Architecture (ISCA). IEEE, 2018. (12 pages in English).

Chang, Yun-Nan, et al, "Design of A Bit-Serial Artificial Neuron VLSI Architecture with Early Termination." 2019 International Conference on Electronics, Information, and Communication (ICEIC). IEEE, 2019., (3 pages).

Korean Office Action issued on Apr. 26, 2024, in counterpart Korean Patent Application No. 10-2019-0061458 (5 pages in English, 7 pages in Korean).

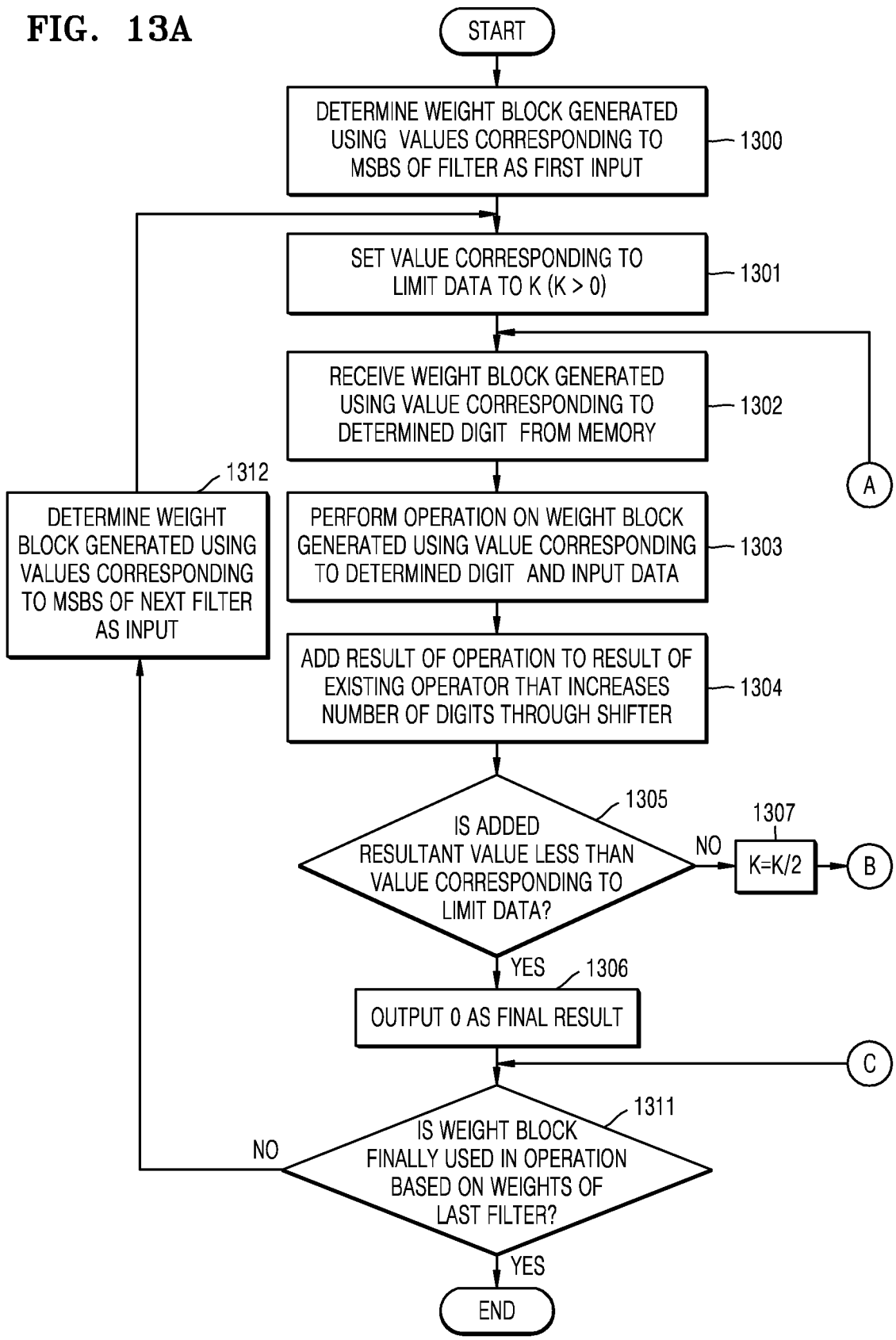

METHOD AND APPARATUS WITH DATA PROCESSING

CROSS-REFERENCE TO RELATED APPLICATION

This application is a continuation of application Ser. No. 16/843,199, filed on Apr. 8, 2020, and claims the benefit of Korean Patent Application No. 10-2019-0061458, filed on May 24, 2019 in the Korean Intellectual Property Office, the disclosures of which are incorporated herein in their entirety by reference.

BACKGROUND

1. Field

The present disclosure relates to a method and apparatus with data processing. The present disclosure includes non-limiting examples related to a method and apparatus performing a sum of product operation in neural network processing.

2. Description of Related Art

Neural networks refer to models in which nodes forming a network through synaptic coupling have a problem-solving ability by changing the strength of the synaptic coupling through learning. Apparatuses for processing a neural network may perform a large computational amount of operations on complex input data. Some neural networks may use a rectified linear unit (ReLU) activation function in which a final resultant value of a convolution operation is input. The ReLU activation function may output 0 for every negative input value and output the input value itself for every positive input value.

However, when it is correctly determined that a sign of the final resultant value of the convolution operation is negative, if 0 is output, a degree to which the amount of operation is reduced may be limited.

SUMMARY

Provided are a method and apparatus with data processing.

Additional aspects will be set forth in part in the description which follows and, in part, will be apparent after an understanding of the description.

In one general aspect, a processor-implemented method of processing neural network data, including: setting first limit data by performing a first operation based on first input data and weight data generated from weights included in a filter; comparing the first limit data with an intermediate result of a second operation performed based on second input data and the weight data; and determining whether to perform a subsequent second operation based on a result of the comparing.

The method may further include receiving the second input data at a layer of a neural network; and outputting 0 to a subsequent layer of the neural network using a rectified linear unit (ReLU), in response to the determining of whether to perform the subsequent second operation resulting in a determining to not perform the subsequent second operation.

The weight data may be generated based on values of the encoded weights corresponding to same bit positions of the encoded weights, and the encoded weights may be weights encoded based on an inverted two's complement representation format of the weights.

The weights encoded in the inverted two's complement representation format may include a positive MSB and negative remaining bits.

The first limit data may include data corresponding to values exceeding 0.

The first operation may include one or more sum of product operations based on the first input data and the weight data.

The setting of the first limit data may include: obtaining first operation resultant values as a result of an operation of the first operation performed based on a part of the first input data and the weight data; obtaining second operation resultant values as a result of an operation of the first operation performed based on all of the first input data and the weight data; and setting the first limit data based on a correlation between the first operation resultant values and the second operation resultant values.

The setting of the first limit data may include: setting the first limit data based on a maximum value of the first operation resultant values for which the second operation resultant values are negative values.

The first limit data may correspond to a sum of the maximum value and a bias, and the bias may be set based on a total computational amount of the first operation based on the first input data and the weight data and on an accuracy of the operations.

The determining may include: in response to the intermediate result of the second operation being less than the first limit data, determining to not perform the subsequent second operation and outputting 0.

The intermediate result may correspond to a result of the second operation performed based on the second input data and a first weight block generated using values corresponding to Most Significant Bits (MSBs) of the weights among the weight data.

The subsequent second operation may be performed based on the second input data and a second weight block of next-most significant bits to the MSBs of the weights among the weight data.

The comparing may include: obtaining a first intermediate resultant value as a result of an operation of the second operation performed based on the second input data and the first weight block; obtaining a second intermediate resultant value as a result of an operation of the second operation performed based on the second input data and a second weight block generated using values corresponding to next-most significant bits to the MSBs of the weights; and comparing the first limit data with a ratio of the first and second intermediate resultant values to the first intermediate resultant value, wherein the first limit data is determined based on a total computational amount of the first operation and an accuracy of the first operation.

The method may further include: determining to perform the subsequent second operation in response to the intermediate result being greater than the first limit data; receiving a second weight block generated using values corresponding to next-most significant bits to the MSBs of the weights among the weight data; obtaining a second intermediate resultant value as a result of the subsequent second operation based on the second input data and the second weight block; and determining whether to perform another subsequent second operation based on a comparison result of the second intermediate resultant value and second limit data, wherein the second limit data has a magnitude of 1/x times the first limit data, x being a real number greater than 1.

A non-transitory computer-readable storage medium may store instructions that, when executed by one or more processors, cause the one or more processors to perform the method.

In another general aspect, a data processing apparatus includes: one or more processors configured to: set first limit data by performing a first operation based on first input data and weight data generated from weights included in a filter, compare the first limit data with an intermediate result of a second operation performed based on second input data and the weight data, and determine whether to perform a subsequent second operation based on a result of the comparing.

The weight data may be generated based on values of the encoded weights corresponding to same bit positions of the encoded weights, and the encoded weights may be encoded based on an inverted two's complement representation format of the weights.

The first limit data may include data corresponding to values exceeding 0.

The one or more processors may be further configured to: obtain first operation resultant values as a result of an operation of the first operation performed based on a part of the first input data and the weight data, obtain second operation resultant values as a result of an operation of the first operation performed based on all of the first input data and the weight data, and set the first limit data based on a correlation between the first operation resultant values and the second operation resultant values.

The one or more processors may be further configured to set the first limit data based on a maximum value of the first operation resultant values for which the second operation resultant values are negative values.

The first limit data may correspond to a sum of the maximum value and a bias, and the bias may be set based on a total computational amount of the first operation based on the first input data and the weight data and on an accuracy of the operations.

The one or more processors may be further configured to, in response to the intermediate result of the second operation being less than the first limit data, determine to not perform the subsequent second operation and output 0.

The intermediate result may correspond to a result of the second operation performed based on the second input data and a first weight block generated using values corresponding to Most Significant Bits MSBs of the weights among the weight data.

The one or more processors may be further configured to: obtain a first intermediate resultant value as a result of an operation of the second operation performed based on the second input data and the first weight block, obtain a second intermediate resultant value as a result of an operation of the second operation performed based on the second input data and a second weight block generated using values corresponding to next-most significant bits to the MSBs of the weights, and compare the first limit data with a ratio of the first and second intermediate resultant values to the first intermediate resultant value, wherein the first limit data is determined based on a total computational amount of the first operation and an accuracy of the first operation.

The one or more processors may be further configured to: determine to perform the subsequent second operation in response to the intermediate result is greater than the first limit data; receive a second weight block generated using values corresponding to next-most significant bits to the MSBs of the weights among the weight data, obtain a second intermediate resultant value as a result of the subsequent second operation based on the second input data and the second weight block, and determine whether to perform another subsequent second operation based on a comparison result of the second intermediate resultant value and second limit data, wherein the second limit data has a magnitude of 1/x times the first limit data, x being a real number greater than 1.

The apparatus may further include a memory storing instructions that, when executed by the one or more processors, configure the one or more processors to perform the setting of the first limit data, the comparing of the first limit data, and the determining of whether to perform the subsequent second operation.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13A and FIG. 13B are flowcharts for explaining an example of a process performed by a data processing apparatus to determine whether to continue an operation based on limit data;

DETAILED DESCRIPTION

Figure 1:
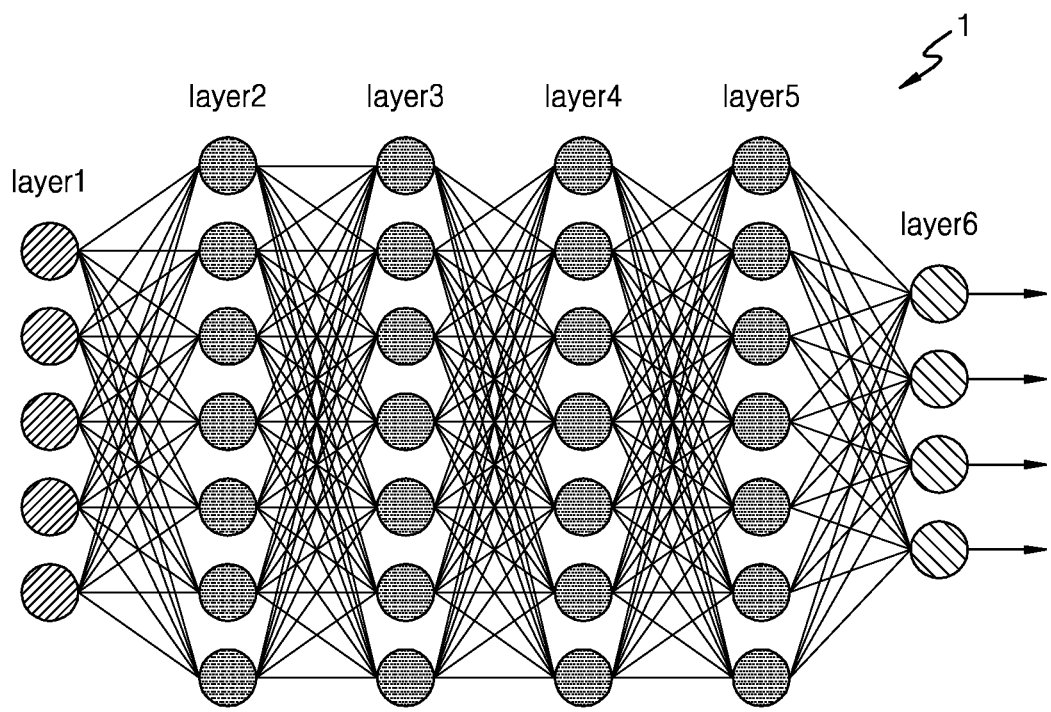
FIG. 1 is a diagram illustrating an example of a neural network architecture.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Although general terms being widely used in the disclosure were selected as terminology used in the disclosure while considering the functions of the disclosure, they may vary according to intentions of one of ordinary skill in the art, judicial precedents, the advent of new technologies, and the like. Terms arbitrarily selected by the applicant of the disclosure may also be used in some cases. In this case, their meanings need to be given in the detailed description of the disclosure. Hence, the terms must be defined based on the meanings of the terms and the contents of the entire specification, not by simply stating the terms themselves.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which this disclosure pertains and after an understanding of the disclosure of this application. It will be further understood that terms, such as those defined in commonly-used dictionaries, should be interpreted as having a meaning that is consistent with their meaning in the context of the relevant art and the disclosure of this application, and will not be interpreted in an idealized or overly formal sense unless expressly so defined herein.

Hereinafter, example embodiments will be described with reference to the accompanying drawings. However, the embodiments may be implemented in various different forms and are not limited to the examples described below.

FIG. 1 is a diagram illustrating an example of a neural network architecture.

A neural network 1 shown in FIG. may be an example of a deep neural network (DNN) architecture. The DNN may be, but is not limited to, a convolutional neural network (CNN), a recurrent neural network (RNN), or the like. For example, the neural network 1 may be a DNN including an input layer 1, four hidden layers 2, 3, 4, and 5, and an output layer 6. However, the amount of hidden layers is not limited thereto, and the neural network 1 may include less than five and may include five or more hidden layers, for example.

When the neural network 1 is implemented as the DNN architecture, the neural network 1 may include a plurality of layers capable of processing valid information. Thus, the neural network 1 may process more complex data sets than a neural network including a single layer. Meanwhile, although FIG. 1 illustrates that the neural network 1 includes six layers, this is merely an example. The neural network 1 may include fewer or more layers. That is, the neural network 1 may include layers of various structures different than, though represented by, the structure of the layers shown in FIG. 1.

Figure 2:
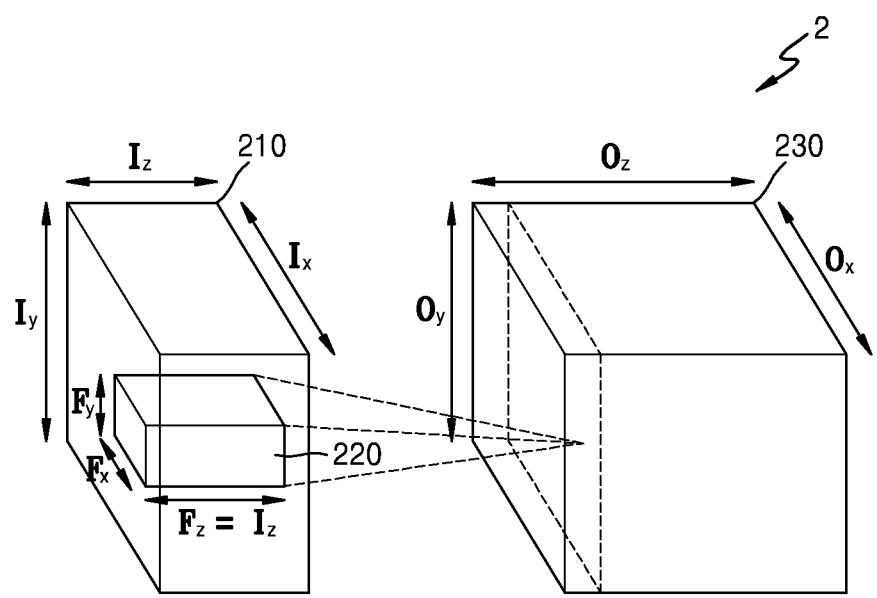
FIG. 2 is a diagram illustrating an example of a convolution layer.

FIG. 2 is a diagram illustrating an example of a convolutional layer (e.g., convolution layer 2).

FIG. 2 illustrates a part of the convolution layer 2. However, in addition to the convolution layer 2 shown in FIG. 2, a neural network may further include a pooling layer, a fully connected layer, and the like. The convolution layer 2 of FIG. 2 may include an input activation map 210 having a size of Ix×Iy×Iz, a weight filter 220 having a size of Fx×Fy×Iz, and an output activation map 230 having a size of Ox×Oy×Oz.

The input activation map 210, the weight filter 220, and the output activation map 230 may respectively include input activation values, weight values, and output activation values. The input activation map 210 performs a convolution operation with the weight filter 220, and as a result, the output activation map 230 is generated. For example, the weight filter 220 and the input activation map 210 may perform the convolution operation by using a sliding window method. For example, the convolution operation of input activations within a sliding window and weights of the weight filter 220 may be performed. The output activation map 230 may be an input activation map 210 of a layer subsequent to the convolution layer 2 (e.g., the convolution layer 3) such that the input activation map 210 performs the convolution operation with the weight filter 220. This convolution operation is repeated.

Although only one weight filter 220 is shown in FIG. 2, a plurality of weight filters 220 may perform the convolution operation with the input activation map 210 to generate the output activation map 230.

The above-described operation may be expressed as a sum of product between an input activation and a weight. For example, the following Equation 1 expresses a sum of product operation of adding N times a product between an input activation a and a weight w.

$$S = \sum_{i=1}^{N} a_i \times w_i \qquad \text{Equation 1}$$

In Equation 1 above, $a_i$ denotes an i-th input activation, $w_i$ denotes an i-th weight, and S denotes a resultant value of the sum of product operation.

In the neural network, an input value to a rectified linear unit (ReLU) activation function may be a resultant value of an operation in the convolution layer 2 or the fully connected layer. The ReLU activation function is defined as f(x)=max (0, x) which outputs 0 as a resultant value for a negative input and outputs the input itself as the resultant value for a positive input.

When an example data processing apparatus of the present application determines that a sign of a final resultant value of the operation is negative before the operation is completed, and thereby outputs 0 without having to complete the operation, an amount of operation may be advantageously reduced.

In contrast, in a typical data processing apparatus, when 0 is output only in case where it is correctly determined that the sign of the final resultant value of the operation is negative, while accuracy of the neural network may not be influenced, a degree of reduction of the amount of operation may be disadvantageously limited.

Accordingly, to advantageously reduce an amount of operation, an example a data processing apparatus of the present disclosure may compare either one or both of a magnitude of an intermediate resultant value of the operation and a degree to which the intermediate resultant value of the operation is reduced with predetermined limit data such that 0 may be output when it is predicted, prior to completion of the operation, that the sign of the final resultant value of the operation is negative. At this time, the predetermined limit data may include data corresponding to a value exceeding 0.

Accordingly, by appropriately setting the limit data, an example data processing apparatus of the present disclosure may advantageously minimize loss of the accuracy of the neural network may be minimized and simultaneously reduce the amount of operation. An example data processing apparatus of the present disclosure may advantageously minimize the accuracy loss of the neural network while sufficiently reducing the computational amount of operations by outputting 0 when the sign of the final resultant value of the operation is predicted to be negative. Hereinafter, examples in which a data processing apparatus of the present disclosure operates will be described with reference to FIGS. 3 to 16.

Figure 3:
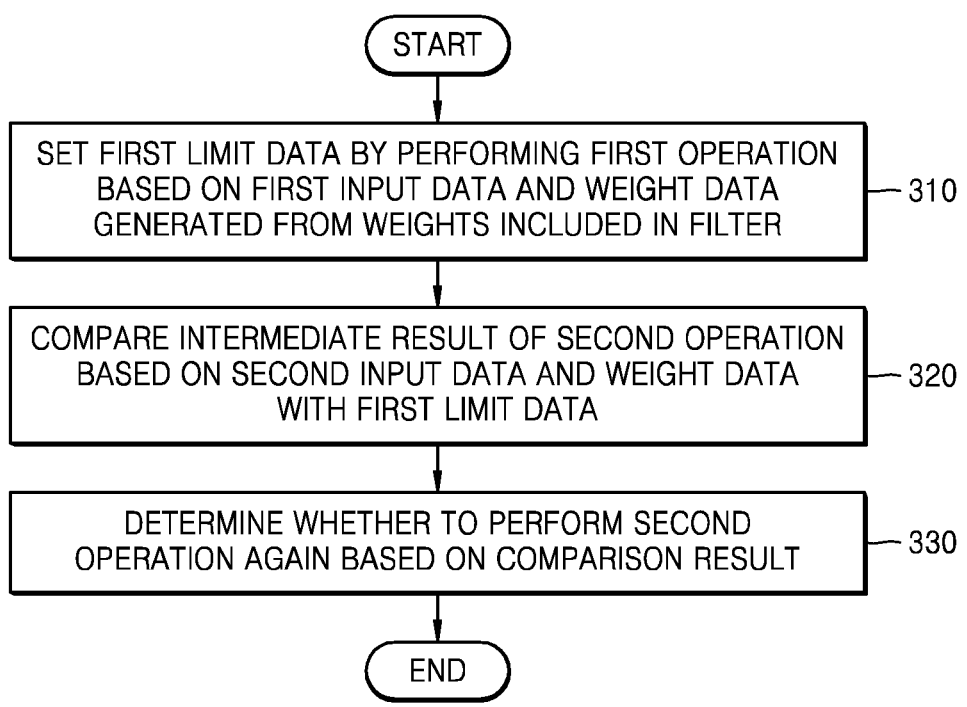
FIG. 3 is a flowchart illustrating an example of a method of processing data.

FIG. 3 is a flowchart illustrating an example of a method of processing data.

Figure 15:
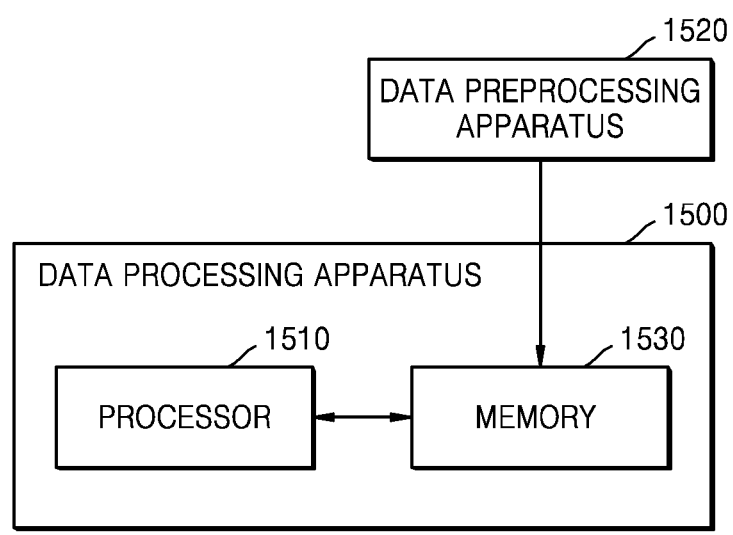
FIG. 15 is a block diagram illustrating an example of a configuration of a data processing apparatus.

Referring to FIG. 3, a method of processing data includes operations that are processed in a time-series manner, wherein the method may be implemented by the data processing apparatus 1500 shown in FIG. 15, in an example. Therefore, it will be understood after an understanding of the present disclosure that the following description of the data processing apparatus 1500 shown in FIG. 15 may also apply to the method of FIG. 3, in an example.

In operation 310, a data processing apparatus 1500 may set first limit data by performing a first operation based on first input data (e.g., data based on input activation map 210) and weight data generated from weights included in a filter (e.g., weight filter 220).

The first input data is data in which input activations are formed as blocks. For example, a data preprocessing apparatus 1520 may form the blocks of the input activations included in an input activation map to generate the first input data. Thus, the first input data may include one or more input activation blocks. At this time, the input activation map may be generated from a part of an input image or an image to be input to the data processing apparatus 1500 after the first limit data is set.

The data preprocessing apparatus 1520 may form blocks by collecting input activations having the same x, y coordinates included in the input activation map. For example, the data preprocessing apparatus 1520 may form blocks by collecting input activations whose x, y coordinates are all 1 and z coordinates are 1 to k (k is an arbitrary natural number).

On the other hand, the weight data may be generated based on values of the encoded weights corresponding to same positions of the encoded plurality of weights included in any one of a plurality of filters' encoded weights, and the weights may be encoded based on an inverted two's complement representation format. Hereinafter, encoding based on an inverted two's complement representation will be described with reference to FIG. 4, and generating the weight data from the encoded weights will be described with reference to FIG. 5.

Figure 4:
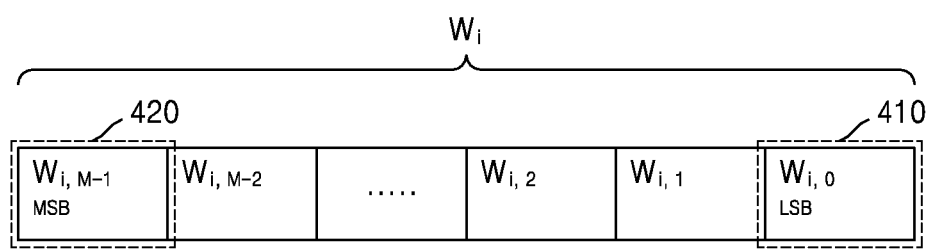
FIG. 4 is a diagram illustrating an example of a coded weight.

FIG. 4 is a diagram illustrating an example of a coded weight.

A fixed point format is a method of representing numerical values assuming that a position of a decimal point is fixed. In FIG. 4, a weight $W_i$ is encoded in the fixed point format, $W_{i,0}$ of a $0^{th}$ digit 410 is a bit corresponding to a least significant bit (LSB) of the weight $W_i$, and $W_{i,M-1}$ of an M-1th digit 420 is a bit corresponding to a most significant bit (MSB) of the weight $W_i$.

When the weight $W_i$ is encoded in a two's complement representation format, the weight $W_i$ is in a format in which the MSB is negative and the remaining digits are positive. Therefore, when the weight $W_i$ is encoded by a two's complement representation format, the weight $W_i$ may be expressed as the following equation, for example.

$$w_i = \sum_{j=0}^{M-1} s_j \times w_{i,j} \times 2^j, \qquad \text{Equation 2}$$

$$s_j = \begin{cases} -1, & \text{if } j = M-1 \\ 1, & \text{if } j \neq M-1 \end{cases}$$

In the above-described Equation 2, Sj is determined by a sign corresponding to a jth digit of the weight $W_i$, and Wi,j denotes a value of a bit corresponding to the jth digit of the weight $W_i$.

When the weight $W_i$ is encoded in an inverted two's complement representation format, the weight $W_i$ is in a format in which the MSB is positive and the remaining digits are negative. When the weight $W_i$ is encoded in the inverted two's complement representation format, the weight $W_i$ may be expressed as the following equation, for example.

$$w_i = \sum_{j=0}^{M-1} s_j \times w'_{i,j} \times 2^j, \qquad \text{Equation 3}$$

$$s_j = \begin{cases} -1, & \text{if } j = M-1 \\ 1, & \text{if } j \neq M-1 \end{cases}$$

In the above-described Equation 3, Sj is determined by the sign corresponding to the jth digit of the weight $W_i$, and Wi,j denotes the value of the bit corresponding to the jth digit of the weight $W_i$.

The data preprocessing apparatus 1520 may encode each of weights included in a filter using the inverted two's complement representation format described above and generate weight data from the encoded weights.

Figure 5:
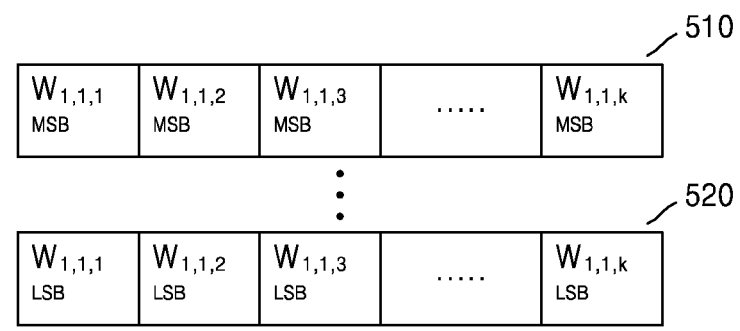
FIG. 5 illustrates an example of weight data.

FIG. 5 illustrates an example of weight data.

The data preprocessing apparatus 1520 may generate the weight data using values corresponding to the same digit of encoded weights.

For example, the data preprocessing apparatus 1520 may form blocks by collecting the values corresponding to the same digit of the encoded weights using an inverted two's complement representation format. On the other hand, the weights to be formed as blocks may be included in one filter and correspond to weights having the same x, y coordinates. An example of the weight data will be described later with reference to FIGS. 11 and 12.

For example, in FIG. 5, a first block 510 is a collection of bits corresponding to an MSB of each of weights whose x, y coordinates are all 1 and z coordinates are 1 to k. A last block 520 is a collection of bits corresponding to an LSB of each of the weights whose x, y coordinates are all 1 and z coordinates are 1 to k.

Meanwhile, an operation may be performed on the first input data and the weight data by a bit serial method. The bit serial operation method will be described in detail with reference to FIG. 6.

Figure 6:
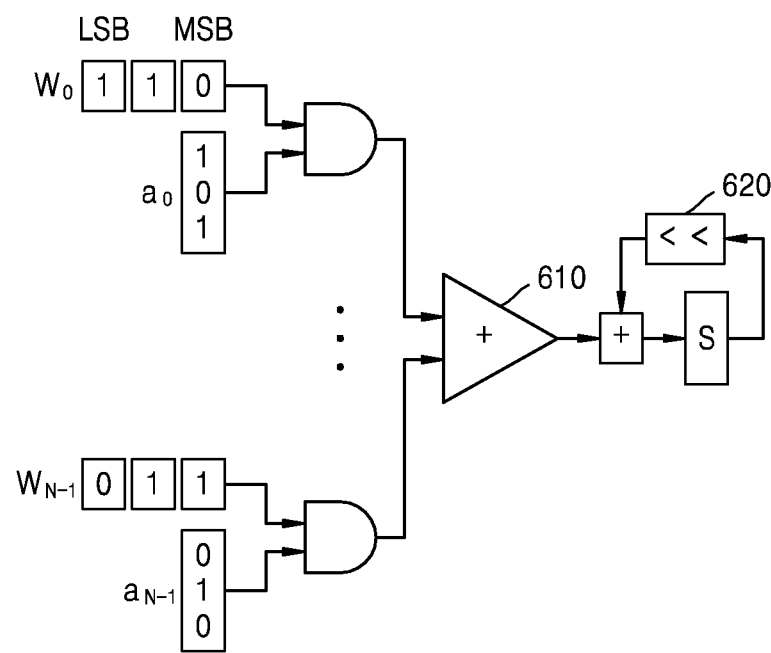
FIG. 6 is a diagram illustrating an example of a bit serial operation method.

FIG. 6 is a diagram illustrating an example of a bit serial operation method.

In FIG. 6, it is assumed that each of weights $W_0$ to $W_{N-1}$ included in a filter is encoded in an inverted two's complement representation format. $a_0$ to $a_{N-1}$ may correspond to input activations.

When a convolution operation between weights and input activations is performed using the bit serial operation method, bits corresponding to an MSB to an LSB of each weight may be sequentially used for the operation.

For example, the data processing apparatus 1500 may determine whether each of the input activations $a_0$ to $a_{N-1}$ is to be input to an adder 610, based on weight bits corresponding to each MSB from the weights $W_0$ to $W_{N-1}$. Because a bit corresponding to the MSB of $W_0$ is 0, $a_0$ is not input to the adder 610, and because a bit corresponding to the MSB of $W_{N-1}$ is 1, $a_{N-1}$ is input to the adder 610. All of the input activations input to the adder 610 are added to determine an intermediate resultant value S.

Thereafter, the intermediate resultant value S is shifted one digit through a digit shifter 620. The intermediate resultant value S processed by the digit shifter 620 is added to an intermediate resultant value generated based on weight bits corresponding to a next digit of each MSB (e.g., a next-most significant bit to the MSB) from the weights $W_0$ to $W_{N-1}$.

When the same process from the weights $W_0$ to $W_{N-1}$ to each LSB is repeated, a final resultant value of a sum of product operation between the weights and the input activations may be determined.

Figure 7:
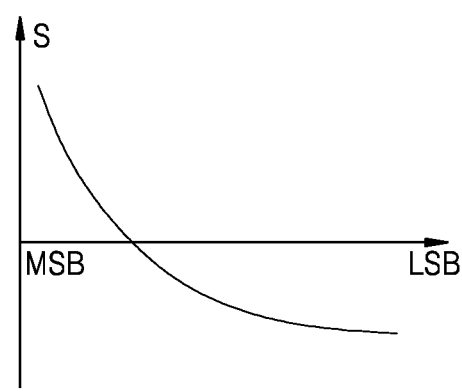
FIG. 7 is a diagram illustrating an example of an operation result according to a change of a weight digit in a first operation based on first input data and weight data.

FIG. 7 is a diagram illustrating an example of an operation result according to a change of a weight digit in a first operation based on first input data and weight data.

A value of each of the input activations constituting the first input data is 0 or a positive value because the value passes through a ReLU activation function in a previous layer.

A weight encoded in an inverted two's complement representation format has an MSB that is positive and the remaining digits that are negative. Accordingly, an operation result of an input activation that is positive and a bit corresponding to an MSB of a weight is positive. Therefore, an operation result between a weight block generated using values corresponding to MSBs of the respective weights in the weight data and the first input data is positive.

On the other hand, an operation result of the input activation that is positive and bits of digits other than the MSB of the weight is negative. Therefore, an operation result between each of weight blocks generated using values corresponding to digits other than MSBs of the respective weights in the weight data and the first input data is negative. As a result, the intermediate resultant value S according to the first operation based on the first input data and the weight data becomes smaller as shown in FIG. 7 in accordance with a change in a weight digit used in the operation.

Meanwhile, the data processing apparatus 1500 may set first limit data by performing the first operation based on the first input data and the weight data. After the first limit data is set, an image on which a convolution operation is to be performed may be newly input to the data processing apparatus 1500. Here, the first limit data may be a threshold that is compared with an intermediate result of an operation based on second input data generated from the newly input image and the weight data. When it is predicted that a sign of a final resultant value of an operation based on input data generated from the newly input image and the weight data is negative by using the first limit data as the threshold, 0 may be output.

For example, the first limit data may be set based on a magnitude of the intermediate resultant value of the first operation based on the first input data and the weight data, which will be described in detail in FIGS. 8 and 9. Alternatively or additionally, the first limit data may be set based on a degree to which the intermediate resultant value of the first operation based on the first input data and the weight data is reduced, which will be described later in FIG. 10.

Figure 8:
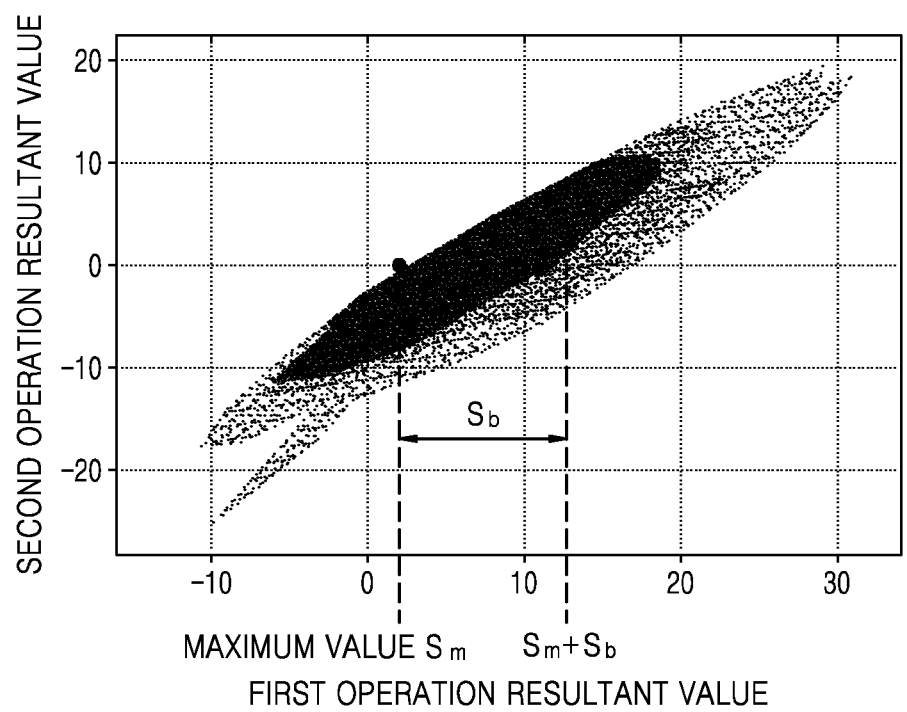
FIG. 8 is a diagram illustrating an example of setting first limit data.

FIG. 8 is a diagram illustrating an example of setting first limit data.

When the first limit data is set based on magnitude of an intermediate resultant value of a first operation based on first input data and weight data, a value corresponding to the first limit data may be compared with an intermediate resultant value of an operation based on input data generated from an image newly input to the data processing apparatus 1500 and the weight data.

Referring to FIG. 8, a graph indicating a correlation between first operation resultant values and second operation resultant values is illustrated.

The first operation resultant values may be obtained from a result of an operation based on a part of the first input data and the weight data.

Meanwhile, the weight data may include a first weight block to an nth weight block. For example, the first weight block may be a block generated using values corresponding to MSBs of weights included in a filter, and a second weight block may be a block generated using values corresponding to next positions of the MSBs (e.g., next-most significant bits to the MSB) of the weights included in the filter. Similarly, the nth weight block may be a block generated using values corresponding to LSBs of the weights included in the filter.

For example, the first operation resultant values may be obtained from a result of an operation based on the first input data and the first weight block generated using the values corresponding to the MSBs of the respective weights in the first input data and the weight data, but are not limited thereto.

The second operation resultant values may be obtained from a result of an operation based on entirety of the first input data and the weight data. Accordingly, the second operation resultant values may correspond to final resultant values obtained after an operation of the first input data and each of the first weight block to an nth weight block is wholly completed.

In the correlation between the first operation resultant values and the second operation resultant values, a first limit value may be set based on a maximum value among values in which the second operation result is negative among the first operation resultant values.

Referring to FIG. 8, among the first operation resultant values, the maximum value among the values in which the second operation result is negative may correspond to $S_m$. That is, when the first operation resultant value is less than $S_m$, because the final resultant value is all negative, the loss of accuracy may be minimized when $S_m$ is set as first limit data.

However, when $S_m$ is set as the first limit data, although the loss of accuracy may be minimized, a reduction degree of a computational amount of operation may not be large. Therefore, the first limit data may be set to correspond to a value obtained by adding a bias of $S_b$ to the maximum value $S_m$, and the larger the bias, the more the amount of operation may be advantageously reduced.

Figure 9:
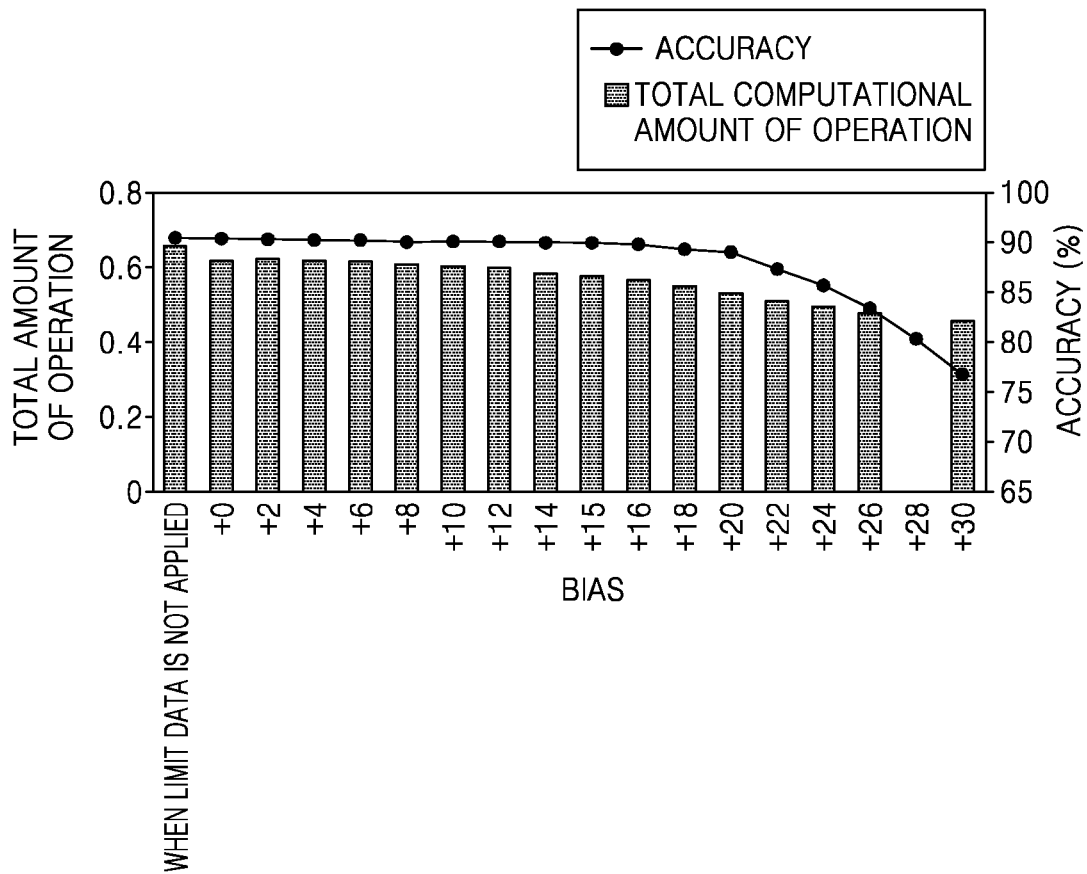
FIG. 9 is a diagram illustrating an example of setting a bias.

FIG. 9 is a diagram illustrating an example of setting a bias.

Referring to FIG. 9, when the first limit value corresponds to a value obtained by adding a bias of $S_b$ to the maximum value $S_m$, the total amount of operation and accuracy of an operation may be determined as the bias increases.

In FIG. 9, the total amount of operation performed between input data generated from an image newly input to the data processing apparatus 1500 and weights included in a filter is 1, without an application of the first limit data. Thus, the total amount of operation of a first operation as the bias increases may be expressed as a value between 0 and 1. The accuracy means accuracy of a neural network as the bias increases. For example, the accuracy may be determined according to whether the same result as the input image is output.

The bias may be set considering a tradeoff relationship between the total amount of operation of a first operation based on first input data and weight data and the accuracy of the operation. For example, referring to FIG. 9, when the bias is 16, although a reduction degree of the total amount of operation is larger than in the case of outputting 0 when it is correctly determined that a sign of a final resultant value of the operation is negative, because there is little loss of accuracy, the first limit data may be set to correspond to a value obtained by adding a bias of 16 to the maximum value $S_m$. That is, when the bias is 16, there is very little loss of accuracy compared to if no bias is set. Accordingly, by setting the bias to 16, accurate results for determining whether a sign of a final resultant value is negative may be achieved even though the total amount of operations is less than if no bias is set.

Figure 10:
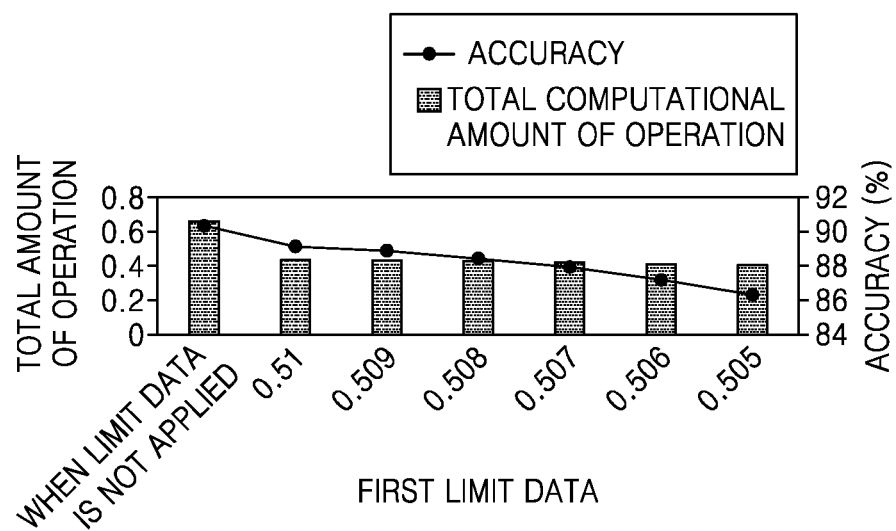
FIG. 10 is a diagram illustrating another example of setting first limit data.

FIG. 10 is a diagram illustrating another example of setting first limit data.

When the first limit data is set based on a reduction degree of an intermediate operation resultant value of a first operation, the first limit data may be compared with a ratio of an intermediate resultant value of a previous step with respect to an intermediate resultant value of a current step in an operation based on input data generated from a newly input image and weight data. Thus, the first limit data may have a value between 0 and 1.

Referring to FIG. 10, the total amount of operation of a first operation and accuracy of the operation may be determined as a value corresponding to the first limit data decreases from 0.51 to 0.505.

In FIG. 10, the total computational amount of operation performed between the input data generated from the image newly input to the data processing apparatus 1500 and weights included in a filter is 1, without an application of the first limit data. Accordingly, the total computational amount of operation of the first operation may be expressed as the value between 0 and 1 as the value corresponding to the first limit data decreases from 0.51 to 0.505. The accuracy means accuracy of a neural network as a bias increases. For example, the accuracy may be determined according to whether the same result as the input image is output.

Referring to FIG. 10, the first limit data may be set considering a tradeoff relationship between the total amount of operation of the first operation based on first input data and weight data and the accuracy of the operation.

Referring back to FIG. 3, in operation 320, the data processing apparatus 1500 may compare an intermediate result of the second operation based on the second input data and the weight data with the first limit data.

The second input data may be formed from the image newly input to the data processing apparatus 1500 after the first limit data is set. For example, an input activation map may be generated from the newly input image, and a data preprocessing apparatus 1520 may form blocks of input activations included in the input activation map to form the second input data.

The weight data is the same as that described above with reference to FIG. 5, and thus a description thereof will be omitted. In addition, the second operation between the second input data and the weight data may be performed using a bit serial operation method as described above with reference to FIG. 6. Accordingly, the intermediate resultant value according to a change in a weight digit used in the operation in the second operation between the second input data and the weight data becomes smaller as described above with reference to FIG. 7.

When the first limit data is set based on the magnitude of the intermediate operation resultant value of the first operation based on the first input data and the weight data, a method of comparing an intermediate result of the second operation with the first limit data will be described in detail with reference to FIG. 11 below. Also, when the first limit data is set based on the reduction degree of the intermediate resultant value of the first operation based on the first input data and the weight data, a method of comparing an intermediate result of the second operation with the first limit data will be described later in detail with reference to FIG. 11 below.

Figure 11:
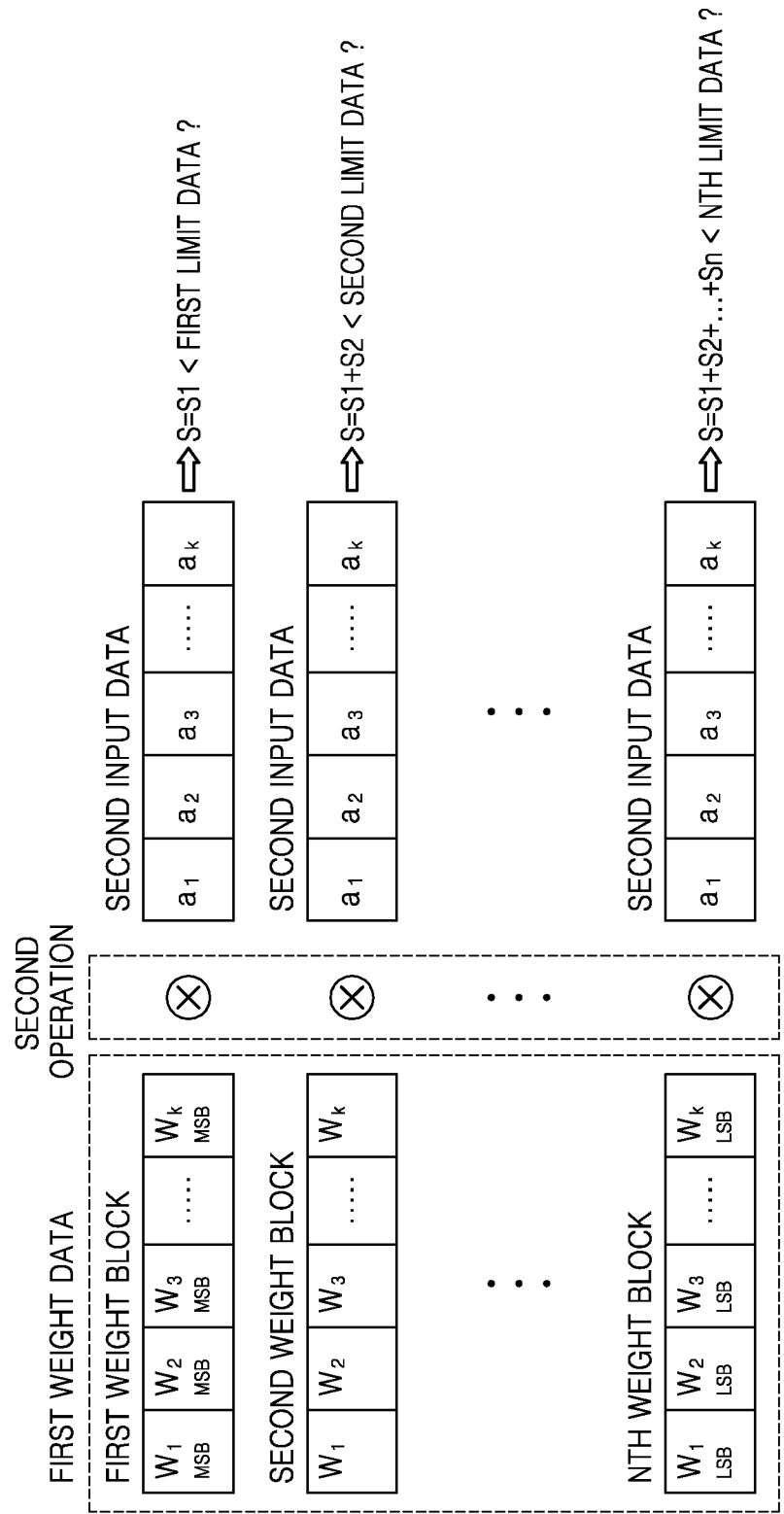
FIG. 11 is a diagram illustrating an example of comparing an intermediate result of a second operation with first limit data.

FIG. 11 is a diagram illustrating an example of comparing an intermediate result of a second operation with first limit data.

Referring to FIG. 11, weight data may include a first weight block to an nth weight block. For example, the first weight block may be a block generated using values corresponding to MSBs of weights included in a filter, and a second weight block may be a block generated using values corresponding to next positions of the MSBs (e.g., next-most significant bits to the MSBs) of the weights included in the filter. Similarly, the nth weight block may be a block generated using values corresponding to LSBs of the weights included in the filter.

$S_1$ may be a result obtained through an operation of second input data and the first weight block, and $S_2$ may be a result obtained through an operation of the second input data and the second weight block. Similarly, $S_n$ may be a result obtained through an operation of the second input data and the nth weight block. Therefore, the intermediate resultant value S of the operation based on the second input data and the weight data may be sequentially updated to S1, S1+S2, ..., S1+S2+...+Sn as each step of the operation progresses.

First, the data processing apparatus 1500 may compare S1 which is an intermediate result obtained in a first step of the second operation, with the predetermined first limit data to determine whether S1 is less than the first limit data. At this time, the first limit data may be set based on magnitude of an intermediate resultant value of a first operation based on the first input data and the weight data. When the intermediate result S1 is less than the first limit data, the data processing apparatus 1500 may stop or cease the second operation and output 0.

When the intermediate result S1 is greater than the first limit data, the data processing apparatus 1500 may receive the second weight block generated using the values corresponding to an MSB next position of the weights in the weight data. The data processing apparatus 1500 may compare S1+S2, which is an intermediate result of the second operation based on the second input data and the second weight block, with second limit data to determine whether S1+S2 is less than the second limit data. When the intermediate result S1+S2 is less than the second limit data, the data processing apparatus 1500 may stop the second operation and output 0.

A value corresponding to the second limit data may have a magnitude of 1/x (where x is a real number greater than 1) times a value corresponding to the first limit data. For example, the value corresponding to the second limit data may have magnitude of ½ times the value corresponding to the first limit data, but is not limited thereto. As described above, a value corresponding to limit data set for each step of the second operation may have the magnitude of 1/k times limit data set in a previous step.

Accordingly, the data processing apparatus 1500 may determine whether the intermediate resultant value S obtained for each step of the second operation is less than the limit data set for each step, and output 0 and stop the second operation when the intermediate resultant value S is less than the limit data set for a given step.

Figure 12:
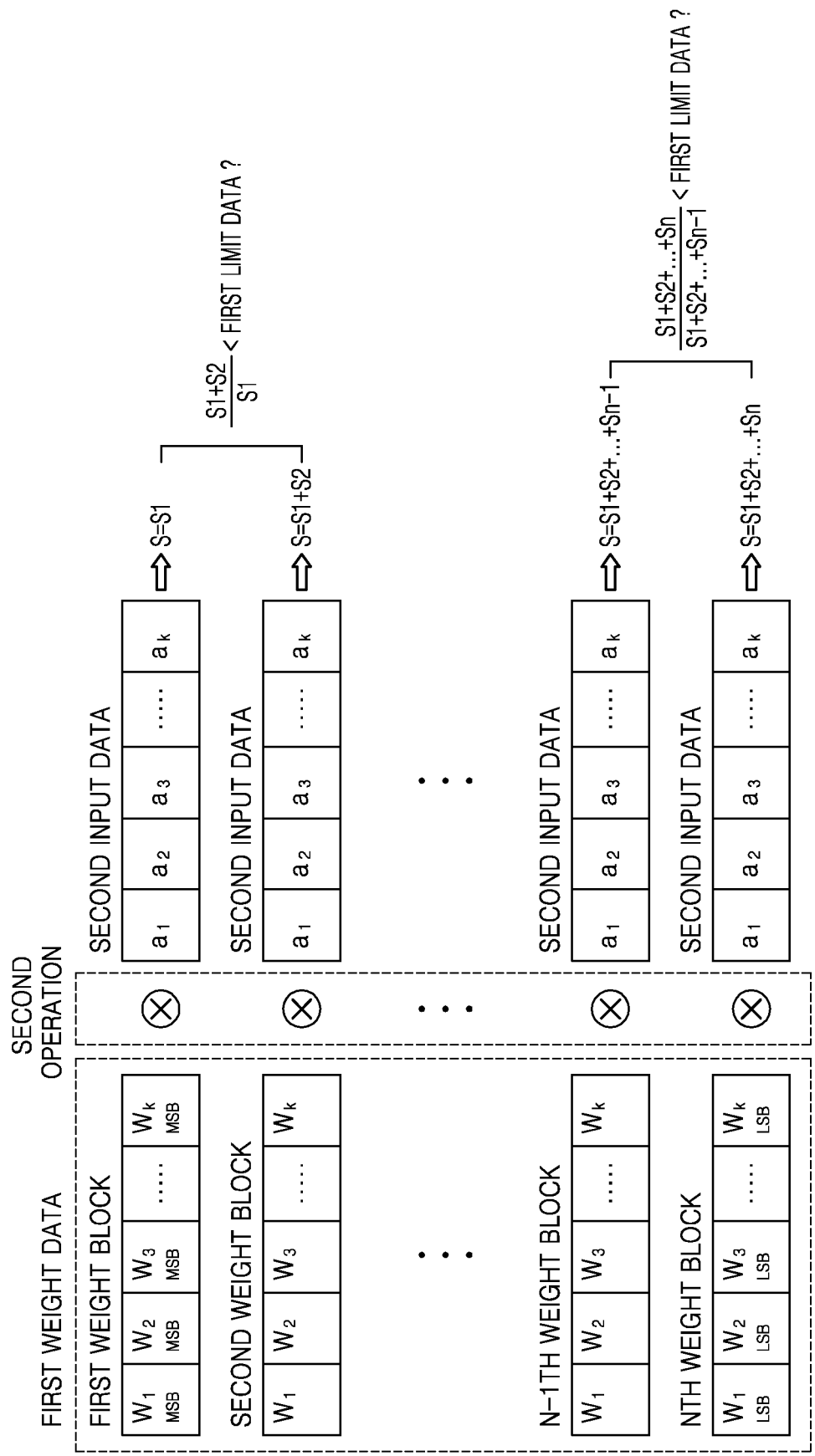
FIG. 12 is a diagram illustrating another example of comparing an intermediate result of a second operation with first limit data.

FIG. 12 is a diagram illustrating another example of comparing an intermediate result of a second operation with first limit data.

In FIG. 12, the first limit data may be set based on a degree to which an intermediate resultant value of a first operation based on first input data and weight data is reduced. As with respect to FIG. 11 above, redundant descriptions with those in FIG. 10 will be omitted.

First, the data processing apparatus 1500 may obtain the first intermediate resultant value S1 by performing an operation on a first weight block which is a block generated using second input data and values corresponding to MSBs of weights. In addition, the data processing apparatus 1500 may obtain the second intermediate resultant value S1+S2 by performing an operation on a second weight block which is a block generated using the second input data and values corresponding to an MSB next position of weights.

The data processing apparatus 1500 may compare a ratio of the second intermediate resultant value S1+S2 with respect to the first intermediate resultant value S1 and the first limit data to determine whether the ratio of S1+S2 with respect to S1 is less than the first limit data. When the ratio of S1+S2 with respect to S1 is less than the first limit data, the data processing apparatus 1500 may stop a second operation and output 0.

That is, the data processing apparatus 1500 may determine whether a ratio of an intermediate resultant value obtained in a current step with respect to an intermediate resultant value obtained in a previous step of the second operation is less than predetermined limit data between the respective steps.

Referring again to FIG. 3, in operation 330, the data processing apparatus 1500 may determine whether to continue the second operation based on a comparison result.

As an example, when the first limit data is set based on magnitude of the intermediate resultant value of the first operation based on the first input data and the weight data, the data processing apparatus 1500 may determine whether the intermediate resultant value S obtained for each step of the second operation is less than limit data set for each step. When the intermediate resultant value S of each step is less than the corresponding limit data, the data processing apparatus 1500 may stop the operation and output 0. When S1+S2+ . . . +Sn, which is an intermediate result of the second operation based on the second input data and an nth weight block, is also greater than nth limit data, the data processing apparatus 1500 may output S1+S2+ . . . +Sn as it is.

As another example, when the first limit data is set based on the degree to which the intermediate resultant value of the first operation based on the first input data and the weight data is reduced, the data processing apparatus 1500 may determine whether a ratio of an intermediate resultant value obtained in a current step with respect to an intermediate resultant value obtained in a previous step of the second operation is less than predetermined limit data between the respective steps. When the ratio of the intermediate resultant value obtained in the current step with respect to the intermediate resultant value obtained in the previous step is less than the corresponding limit data, the data processing apparatus 1500 may stop the operation and output 0. When a ratio of the intermediate resultant value S1+S2+ . . . +Sn with respect to the intermediate resultant value S1+S2+ . . . +Sn-1 is greater than the first limit data, the data processing apparatus 1500 may output S1+S2+ . . . +Sn as it is.

Figure 13B:
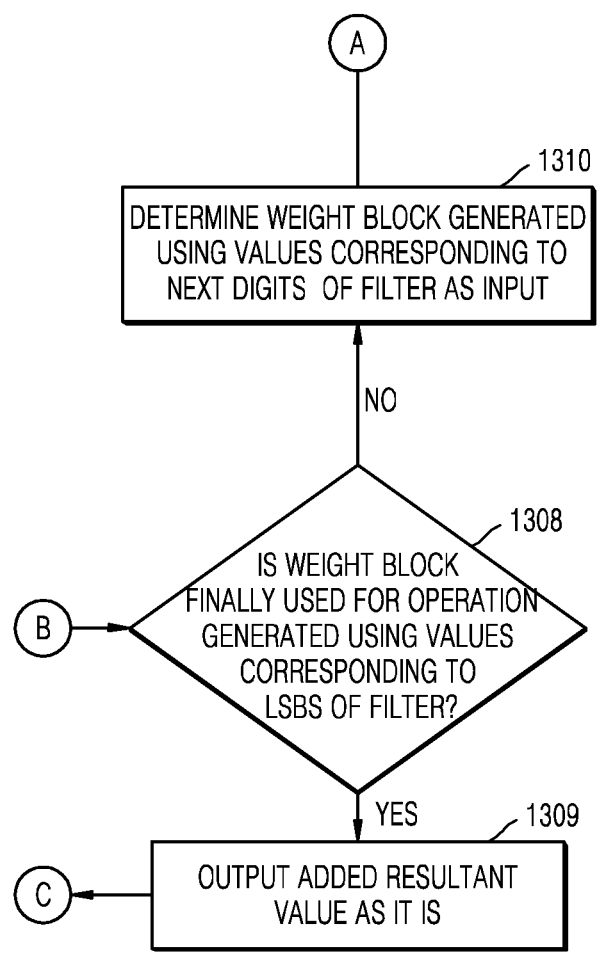

FIG. 13A and FIG. 13B are flowcharts for explaining an example of a process performed by a data processing apparatus to determine whether to continue an operation based on limit data.

In operation 1300, the data processing apparatus 1500 determines a weight block generated using values corresponding to MSBs of a filter as a first input.

In operation 1301, the data processing apparatus 1500 sets a value corresponding to the limit data to K (K is a real number greater than 0). The limit data may be a threshold that is compared with an intermediate result of an operation based on input data generated from an image input to the data processing apparatus 1500 and the weight data.

In operation 1302, the data processing apparatus 1500 receives a weight block generated using a value corresponding to a determined position from a memory.

In operation 1303, the data processing apparatus 1500 performs an operation on the weight block generated using the value corresponding to the determined position and the input data.

In operation 1304, the data processing apparatus 1500 adds a result of the operation to a result of an existing operator that increases the number of digits through a shifter.

In operation 1305, the data processing apparatus 1500 determines whether an added resultant value is less than a value corresponding to the limit data. When the added resultant value is less than the value corresponding to the limit data, the data processing apparatus 1500 proceeds to operation 1306. However, when the added resultant value is greater than the value corresponding to the limit data, the data processing apparatus 1500 proceeds to operation 1307.

In operation 1306, the data processing apparatus 1500 outputs 0 as a final result. When the added resultant value is less than the value corresponding to the limit data, a sign of the final resultant value of the operation is predicted to be negative, and 0 is output as the final result to reduce an amount of operation.

In operation 1307, the data processing apparatus 1500 sets the value corresponding to the limit data to K/2.

In operation 1308, the data processing apparatus 1500 determines whether a weight block finally used for the operation is generated using values corresponding to LSBs of the filter. When the weight block is generated using the values corresponding to the LSBs of the filter, the data processing apparatus 1500 proceeds to operation 1309. Otherwise, the data processing apparatus 1500 proceeds to operation 1310.

In operation 1309, the data processing apparatus 1500 outputs the added resultant value as it is.

In operation 1310, the data processing apparatus 1500 determines a weight block generated using values corresponding to next positions of the filter as an input, and returns to operation 1302. That is, operations 1302 to 1309 are repeated until an operation is performed on the weight block generated using the values corresponding to the LSBs of the filter.

In operation 1311, the data processing apparatus 1500 determines whether the weight block finally used in the operation is based on weights of a last filter. That is, after the operation of the filter is completed and a value of 0 or a specific positive value is output, an operation is performed on a next filter. When the weight block finally used in the operation is not based on the weights of the last filter, the data processing apparatus 1500 proceeds to operation 1312. When the weight block finally used in the operation is based on the weights of the last filter, the data processing apparatus 1500 ends the operation.

In operation 1312, the data processing apparatus 1500 determines a weight block generated using values corresponding to MSBs of the next filter as an input, and returns to operation 1301. That is, operations 1301 to 1311 are repeated until the operation is completed for all the filters.

Figure 14A:
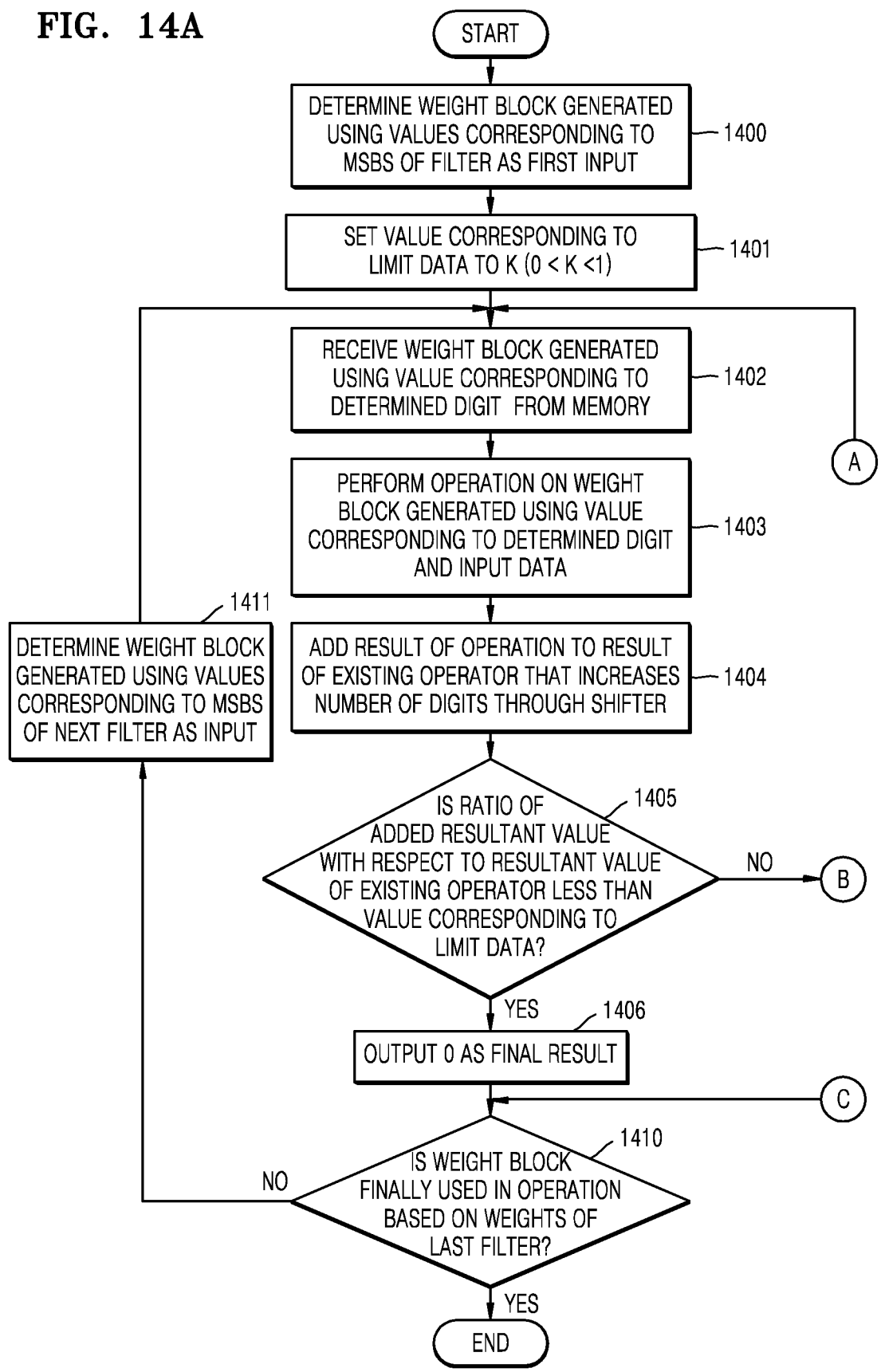
FIG. 14A and FIG. 14B are flowcharts for explaining another example of a process performed by a data processing apparatus to determine whether to continue an operation based on limit data.
Figure 14B:
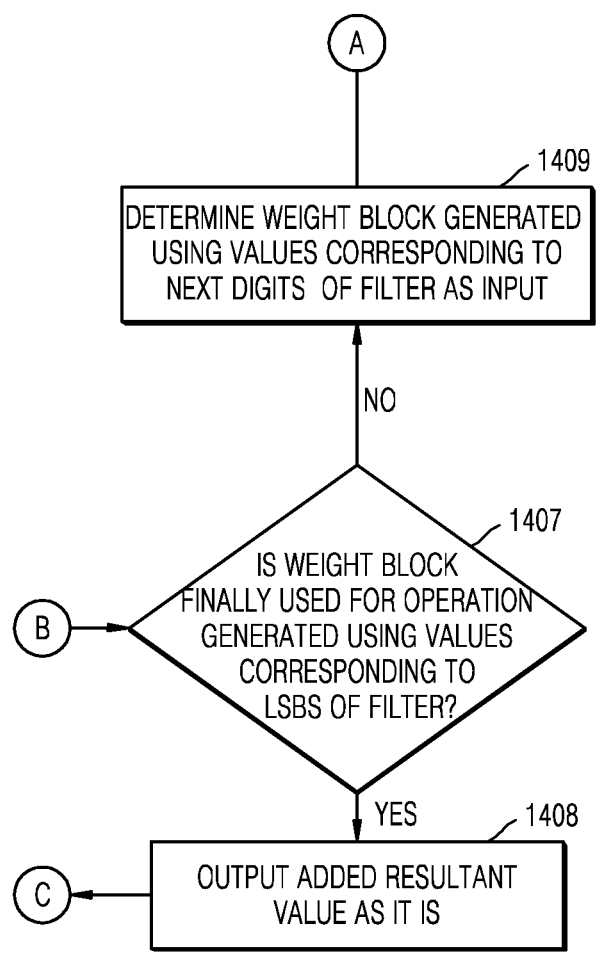

FIG. 14A and FIG. 14B are flowcharts for explaining another example of a process performed by a data processing apparatus to determine whether to continue an operation based on limit data.

In operation 1400, the data processing apparatus 1500 determines a weight block generated using values corresponding to MSBs of a filter as a first input.

In operation 1401, the data processing apparatus 1500 sets a value corresponding to the limit data to K (K is a real number between 0 and 1). The limit data may be a threshold that is compared with an intermediate result of an operation based on input data generated from an image input to the data processing apparatus 1500 and the weight data.

In operation 1402, the data processing apparatus 1500 receives a weight block generated using a value corresponding to a determined position from a memory.

In operation 1403, the data processing apparatus 1500 performs an operation on the weight block generated using the value corresponding to the determined position and the input data.

In operation 1404, the data processing apparatus 1500 adds a result of the operation to a result of an existing operator that increases the number of digits through a shifter.

In operation 1405, the data processing apparatus 1500 determines whether a ratio of an added resultant value with respect to a resultant value of an existing operator is less than a value corresponding to the limit data. When the ratio of the added resultant value with respect to the resultant value of the existing operator is less than the value corresponding to the limit data, the data processing apparatus 1500 proceeds to operation 1406. However, when the ratio of the added resultant value with respect to the resultant value of the existing operator is greater than the value corresponding to the limit data, the data processing apparatus 1500 proceeds to operation 1407.

In operation 1406, the data processing apparatus 1500 outputs 0 as a final result. When the ratio of the added resultant value with respect to the resultant value of the existing operator is less than the value corresponding to the limit data, a sign of the final resultant value of the operation is predicted to be negative, and 0 is output as the final result to reduce a computational amount of operation.

In operation 1407, the data processing apparatus 1500 determines whether a weight block finally used for the operation is generated using values corresponding to LSBs of the filter. When the weight block is generated using the values corresponding to the LSBs of the filter, the data processing apparatus 1500 proceeds to operation 1408. Otherwise, the data processing apparatus 1500 proceeds to operation 1409.

In operation 1408, the data processing apparatus 1500 outputs the added resultant value as it is.

In operation 1409, the data processing apparatus 1500 determines a weight block generated using values corresponding to next positions of the filter as an input, and returns to operation 1402. That is, operations 1402 to 1409 are repeated until an operation is performed on the weight block generated using the values corresponding to the LSBs of the filter.

In operation 1410, the data processing apparatus 1500 determines whether the weight block finally used in the operation is based on weights of a last filter. That is, after the operation of the filter is completed and a value of 0 or a specific positive value is output, an operation is performed on a next filter. When the weight block finally used in the operation is not based on the weights of the last filter, the data processing apparatus 1500 proceeds to operation 1411. When the weight block finally used in the operation is based on the weights of the last filter, the data processing apparatus 1500 ends the operation.

In operation 1411, the data processing apparatus 1500 determines a weight block generated using values corresponding to MSBs of the next filter as an input, and returns to operation 1402. That is, operations 1402 to 1410 are repeated until the operation is completed for all the filters.

FIG. 15 is a block diagram illustrating an example of a configuration of a data processing apparatus.

The data processing apparatus 1500 may be implemented as various types of devices such as a personal computer (PC), a server device, a mobile device, an embedded device, etc. For example, the data processing apparatus 1500 may be implemented as a smart phone, a tablet device, an Augmented Reality (AR) device, an Internet of Things (IoT) device, autonomous vehicle, robotics, a medical device, and the like performing speech recognition, image recognition, and image classification using a neural network, but is not limited thereto. Further, the data processing apparatus 1500 may correspond to a dedicated hardware accelerator mounted on the above-mentioned device, and the data processing apparatus 1500 may be a hardware accelerator such as a neural processing unit (NPU), a tensor processing unit (TPU), neural engine, etc. which is a dedicated module for driving a neural network, but is not limited thereto.

Referring to FIG. 15, the data processing apparatus 1500 may include a processor 1510 (e.g., one or more processors) and a memory 1530 (e.g., one or more memories). It will be apparent to those skilled in the art after an understanding of the present disclosure that the data processing apparatus 1500 may further include components other than the components shown in FIG. 15.

The processor 1510 may set first limit data by performing a first operation based on first input data and weight data generated from weights included in a filter. The first input data is data in which input activations included in an input activation map are formed as blocks. The data preprocessing apparatus 1520 may form the blocks of the input activations included in the input activation map to form the first input data. At this time, the input activation map may be generated from a part of a previously input image or an image to be input to the data processing apparatus 1500 after the first limit data is set. Meanwhile, the data preprocessing apparatus 1520 may encode each of weights included in a filter using the inverted two's complement representation format described above, and generate the weight data from the encoded weights. The data preprocessing apparatus 1520 may be a CPU, but is not limited thereto.

The first limit data may be a threshold that is compared with an intermediate result of an operation based on second input data generated from the newly input image and the weight data. When it is predicted that a sign of a final resultant value of an operation based on input data generated from the newly input image and the weight data is negative by using the first limit data as the threshold, 0 may be output.

The first limit data may be set based on magnitude of an intermediate resultant value of the first operation based on the first input data and the weight data or the first limit data may be set based on a degree to which the intermediate resultant value of the first operation based on the first input data and the weight data is reduced.

The processor 1510 may compare an intermediate result of a second operation based on the second input data and the weight data with the first limit data.

As an example, when the first limit data is set based on magnitude of an intermediate resultant value of the first operation based on the first input data and the weight data, the processor 1510 may determine whether the intermediate resultant value S obtained for each step of the second operation is less than limit data set for each step. As another example, when the first limit data is set based on the degree to which the intermediate resultant value of the first operation based on the first input data and the weight data is reduced, the processor 1510 may determine whether a ratio of an intermediate resultant value obtained in a current step with respect to an intermediate resultant value obtained in a previous step of the second operation is less than predetermined limit data between the respective steps.

The processor 1510 may determine whether to continue the second operation based on a comparison result. As an example, when the intermediate resultant value S of each step is less than the corresponding limit data, the processor 1510 may stop the operation and output 0. As another example, when the ratio of the intermediate resultant value obtained in the current step with respect to the intermediate resultant value obtained in the previous step is less than the corresponding limit data, the processor 1510 may stop the operation and output 0.

The processor 1510 may be implemented as a central processing unit (CPU), a graphics processing unit (GPU), an application processor (AP), or the like, which are provided in the data processing apparatus 1500, but is not limited thereto.

The memory 1530 may store data processed by and data to be processed by the data processing apparatus 1500. For example, the memory 1530 may store first input data, second input data, weight data, and the like. The memory 1530 may be a random access memory (RAM) such as a dynamic random access memory (DRAM), a static random access memory (SRAM), etc., a read-only memory (ROM), an electrically erasable programmable read-only memory (EEPROM), CD-ROM, Blu-ray or other optical disk storage, a hard disk drive (HDD), a solid state drive (SSD), or a flash memory, but is not limited thereto.

The adders, adder 610, digital shifters, digit shifter 620, data processing apparatuses, data processing apparatus 1500, processors, processor 1510, memories, memory 1530, data preprocessing apparatuses, data preprocessing apparatus 1520, and other components described herein with respect to FIGS. 1-15 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-15 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD–RWs, CD+RWs, DVD-ROMs, DVD–Rs, DVD+Rs, DVD–RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

What is claimed is:

1. A processor-implemented method of processing neural network data, the method comprising:
    setting first limit data by performing a first operation based on first input data and weight data generated from weights included in a filter;
    comparing the first limit data with an intermediate result of a second operation performed based on second input data and the weight data; and
    determining whether to perform a subsequent second operation based on a result of the comparing,
    wherein the weight data is generated based on values of the encoded weights corresponding to same bit positions of the encoded weights, and
    the encoded weights are weights encoded based on an inverted two's complement representation format of the weights.

2. The method of claim 1, wherein the first limit data comprises data corresponding to values exceeding 0.

3. The method of claim 1, wherein the setting of the first limit data comprises:
    obtaining first operation resultant values as a result of an operation of the first operation performed based on a part of the first input data and the weight data;
    obtaining second operation resultant values as a result of an operation of the first operation performed based on all of the first input data and the weight data; and
    setting the first limit data based on a correlation between the first operation resultant values and the second operation resultant values.

4. The method of claim 3, wherein the setting of the first limit data comprises:
    setting the first limit data based on a maximum value of the first operation resultant values for which the second operation resultant values are negative values.

5. The method of claim 4, wherein
    the first limit data corresponds to a sum of the maximum value and a bias, and
    the bias is set based on a total computational amount of the first operation based on the first input data and the weight data and on an accuracy of the operations.

6. The method of claim 1, wherein the determining comprises:
    in response to the intermediate result of the second operation being less than the first limit data, determining to not perform the subsequent second operation and outputting 0.

7. The method of claim 1, wherein the intermediate result corresponds to a result of the second operation performed based on the second input data and a first weight block generated using values corresponding to Most Significant Bits (MSBs) of the weights among the weight data.

8. The method of claim 7, wherein the comparing comprises:
    obtaining a first intermediate resultant value as a result of an operation of the second operation performed based on the second input data and the first weight block;
    obtaining a second intermediate resultant value as a result of an operation of the second operation performed based on the second input data and a second weight block generated using values corresponding to next-most significant bits to the MSBs of the weights; and
    comparing the first limit data with a ratio of the first and second intermediate resultant values to the first intermediate resultant value, wherein the first limit data is determined based on a total computational amount of the first operation and an accuracy of the first operation.

9. The method of claim 7, further comprising:
determining to perform the subsequent second operation in response to the intermediate result being greater than the first limit data;
receiving a second weight block generated using values corresponding to next-most significant bits to the MSBs of the weights among the weight data;
obtaining a second intermediate resultant value as a result of the subsequent second operation based on the second input data and the second weight block; and
determining whether to perform another subsequent second operation based on a comparison result of the second intermediate resultant value and second limit data,
wherein the second limit data has a magnitude of 1/x times the first limit data, x being a real number greater than 1.

10. A non-transitory computer-readable storage medium storing instructions that, when executed by one or more processors, cause the one or more processors to perform the method of claim 1.

11. A data processing apparatus comprising:
one or more processors configured to:
set first limit data by performing a first operation based on first input data and weight data generated from weights included in a filter,
compare the first limit data with an intermediate result of a second operation performed based on second input data and the weight data, and
determine whether to perform a subsequent second operation based on a result of the comparing,
wherein
the weight data is generated based on values of the encoded weights corresponding to same bit positions of the encoded weights, and
the encoded weights are encoded based on an inverted two's complement representation format of the weights.

12. The apparatus of claim 11, wherein the first limit data comprises data corresponding to values exceeding 0.

13. The apparatus of claim 11, wherein the one or more processors are further configured to:
obtain first operation resultant values as a result of an operation of the first operation performed based on a part of the first input data and the weight data,
obtain second operation resultant values as a result of an operation of the first operation performed based on all of the first input data and the weight data, and
set the first limit data based on a correlation between the first operation resultant values and the second operation resultant values.

14. The apparatus of claim 13, wherein the one or more processors are further configured to set the first limit data based on a maximum value of the first operation resultant values for which the second operation resultant values are negative values.

15. The apparatus of claim 14, wherein
the first limit data corresponds to a sum of the maximum value and a bias, and
the bias is set based on a total computational amount of the first operation based on the first input data and the weight data and on an accuracy of the operations.

16. The apparatus of claim 11, wherein the one or more processors are further configured to, in response to the intermediate result of the second operation being less than the first limit data, determine to not perform the subsequent second operation and output 0.

17. The apparatus of claim 11, wherein the intermediate result corresponds to a result of the second operation performed based on the second input data and a first weight block generated using values corresponding to Most Significant Bits MSBs of the weights among the weight data.

18. The apparatus of claim 17, wherein the one or more processors are further configured to:
obtain a first intermediate resultant value as a result of an operation of the second operation performed based on the second input data and the first weight block,
obtain a second intermediate resultant value as a result of an operation of the second operation performed based on the second input data and a second weight block generated using values corresponding to next-most significant bits to the MSBs of the weights, and
compare the first limit data with a ratio of the first and second intermediate resultant values to the first intermediate resultant value,
wherein the first limit data is determined based on a total computational amount of the first operation and an accuracy of the first operation.

19. The apparatus of claim 17, wherein the one or more processors are further configured to:
determine to perform the subsequent second operation in response to the intermediate result is greater than the first limit data;
receive a second weight block generated using values corresponding to next-most significant bits to the MSBs of the weights among the weight data,
obtain a second intermediate resultant value as a result of the subsequent second operation based on the second input data and the second weight block, and
determine whether to perform another subsequent second operation based on a comparison result of the second intermediate resultant value and second limit data,
wherein the second limit data has a magnitude of 1/x times the first limit data, x being a real number greater than 1.

* * * * *